(12) United States Patent
Shirotori et al.

(10) Patent No.: US 7,662,264 B2
(45) Date of Patent: Feb. 16, 2010

(54) METHOD FOR PRODUCING MAGNETIC RECORDING MEDIUM

(75) Inventors: Satoshi Shirotori, Fuchu (JP);
Yoshiyuki Kamata, Ota-ku (JP);
Masatoshi Sakurai, Nerima-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 637 days.

(21) Appl. No.: 11/406,502

(22) Filed: Apr. 19, 2006

(65) Prior Publication Data
US 2006/0280861 A1     Dec. 14, 2006

(30) Foreign Application Priority Data
Apr. 19, 2005     (JP)     ............... P2005-121695

(51) Int. Cl.
*C23C 14/34*     (2006.01)
(52) U.S. Cl. ............... 204/192.34; 204/192.32; 216/66
(58) Field of Classification Search ............ 204/192.32, 204/192.34; 216/66
See application file for complete search history.

(56) References Cited

U.S. PATENT DOCUMENTS

| | | | |
|---|---|---|---|
| 3,627,330 A | | 12/1971 | Dimitracopoulos |
| 4,396,479 A | * | 8/1983 | Jones ............... 204/192.32 |
| 4,647,494 A | | 3/1987 | Meyerson et al. |
| 4,701,374 A | | 10/1987 | Sagoi et al. |
| 4,935,278 A | | 6/1990 | Krounbi et al. |
| 5,192,697 A | * | 3/1993 | Leong ............... 438/624 |
| 5,402,278 A | | 3/1995 | Morita |
| 5,535,069 A | | 7/1996 | Chiao et al. |
| 5,766,718 A | | 6/1998 | Matsuda et al. |
| 5,771,131 A | | 6/1998 | Pirzadeh |
| 5,772,905 A | | 6/1998 | Chou |
| 5,943,180 A | | 8/1999 | Seo et al. |
| 6,153,281 A | | 11/2000 | Meyer et al. |
| 6,168,845 B1 | | 1/2001 | Fontana, Jr. et al. |
| 6,254,966 B1 | | 7/2001 | Kondo |
| 6,331,364 B1 | | 12/2001 | Baglin et al. |
| 6,365,012 B1 | | 4/2002 | Sato et al. |
| 6,426,845 B1 | | 7/2002 | Sacks et al. |

(Continued)

FOREIGN PATENT DOCUMENTS

CN     1360304     7/2002

(Continued)

OTHER PUBLICATIONS

Hattori et al. "Fabrication of Discrete Track Perpendicular Media for High Recording Density", IEEE Transactions on Magnetics, vol. 40, No. 40, Jul. 2004, pp. 2510-2515.

(Continued)

*Primary Examiner*—Rodney G McDonald
(74) *Attorney, Agent, or Firm*—Nixon & Vanderhye, PC (57) ABSTRACT

A method for producing a magnetic recording medium, includes: forming an SOG film on a surface of a magnetic layer; forming a concavo-convex structure in the SOG film comprising one selected from a group consisting of silica glass, alkylsiloxane polymer, methyl silsesquioxane polymer, hydrogen silsesquioxane polymer and hydro alkylsiloxane polymer; etching the SOG film to expose the surface of the magnetic layer; etching the exposed surface of the magnetic layer by ion milling; and forming a filling layer on the surface of the magnetic layer while leaving a portion of the magnetic layer having been subjected to the ion milling.

12 Claims, 5 Drawing Sheets

U.S. PATENT DOCUMENTS

| | | |
|---|---|---|
| 6,469,852 B1 | 10/2002 | Nakagawa |
| 6,602,620 B1 | 8/2003 | Kikitsu et al. |
| 6,641,935 B1 | 11/2003 | Li et al. |
| 6,689,495 B1 | 2/2004 | Sato et al. |
| 6,751,035 B1 | 6/2004 | Belser |
| 6,753,043 B1 | 6/2004 | Kuo et al. |
| 6,753,130 B1 | 6/2004 | Liu et al. |
| 6,875,492 B1 | 4/2005 | Pirzada et al. |
| 7,209,413 B2 | 4/2007 | Van Der et al. |
| 7,345,838 B2 | 3/2008 | Sakurai et al. |
| 7,388,725 B2 | 6/2008 | Sakurai et al. |
| 7,572,528 B2 | 8/2009 | Yamamoto et al. |
| 2001/0048566 A1 | 12/2001 | Hirano et al. |
| 2002/0081461 A1 | 6/2002 | Nishikawa et al. |
| 2002/0142192 A1* | 10/2002 | Kamata et al. ............ 428/694 T |
| 2002/0182443 A1 | 12/2002 | Ohkubo |
| 2003/0035973 A1 | 2/2003 | Trindade et al. |
| 2004/0050480 A1 | 3/2004 | Angelo et al. |
| 2004/0091748 A1 | 5/2004 | Kamata et al. |
| 2004/0166372 A1* | 8/2004 | Haginoya et al. ........ 428/694 T |
| 2004/0191577 A1 | 9/2004 | Suwa et al. |
| 2004/0247945 A1 | 12/2004 | Chen et al. |
| 2004/0253817 A1* | 12/2004 | Imada et al. ................ 438/688 |
| 2004/0257687 A1 | 12/2004 | Ishida et al. |
| 2005/0045583 A1 | 3/2005 | Fujita et al. |
| 2005/0117253 A1 | 6/2005 | Moriya et al. |
| 2005/0219730 A1 | 10/2005 | Sakurai et al. |
| 2005/0233176 A1 | 10/2005 | Takai et al. |
| 2005/0282038 A1 | 12/2005 | Yamamoto et al. |
| 2006/0012913 A1 | 1/2006 | Nakamura et al. |
| 2006/0014053 A1 | 1/2006 | Asakura et al. |
| 2006/0028750 A1 | 2/2006 | Sakurai et al. |
| 2006/0076509 A1 | 4/2006 | Okino et al. |
| 2006/0132953 A1 | 6/2006 | Asakura et al. |
| 2006/0215306 A1 | 9/2006 | Ehrlich et al. |
| 2006/0280861 A1 | 12/2006 | Shirotori et al. |
| 2007/0070547 A1 | 3/2007 | Kamata et al. |
| 2007/0190365 A1 | 8/2007 | Kodama et al. |

FOREIGN PATENT DOCUMENTS

| | | |
|---|---|---|
| CN | 1558399 | 12/2004 |
| CN | 1637870 | 7/2005 |
| EP | 0 339 813 | 11/1989 |
| EP | 0 339 851 | 11/1989 |
| EP | 0 183 427 | 1/1990 |
| EP | 0 459 265 | 12/1991 |
| EP | 0 468 778 | 1/1992 |
| EP | 0 538 887 | 4/1993 |
| EP | 1463038 | 12/2004 |
| JP | 58-118028 | 7/1983 |
| JP | 62-232720 | 10/1987 |
| JP | 62-256225 | 11/1987 |
| JP | 02-232816 | 9/1990 |
| JP | 2-301018 | 12/1990 |
| JP | 3-142707 | 6/1991 |
| JP | 04-001922 | 1/1992 |
| JP | 04-113515 | 4/1992 |
| JP | 05-258291 | 10/1993 |
| JP | 06-028650 | 2/1994 |
| JP | 06-036263 | 2/1994 |
| JP | 06-076278 | 3/1994 |
| JP | 06-139567 | 5/1994 |
| JP | 07-085406 | 3/1995 |
| JP | 07-153047 | 6/1995 |
| JP | 08-069614 | 3/1996 |
| JP | 08-115519 | 5/1996 |
| JP | 08-241512 | 9/1996 |
| JP | 08-255340 | 10/1996 |
| JP | 09-97419 | 4/1997 |
| JP | 09-245345 | 9/1997 |
| JP | 10-334460 | 12/1998 |
| JP | 11/161943 | 6/1999 |
| JP | 11-161944 | 6/1999 |
| JP | 11-273059 | 10/1999 |
| JP | 11-274152 | 10/1999 |
| JP | 11-348048 | 12/1999 |
| JP | 2000-211082 | 8/2000 |
| JP | 2000-269330 | 9/2000 |
| JP | 2000-306227 | 11/2000 |
| JP | 2001-273682 | 10/2001 |
| JP | 3271406 | 1/2002 |
| JP | 2002-288813 | 10/2002 |
| JP | 2003-016621 | 1/2003 |
| JP | 2003-100609 | 4/2003 |
| JP | 2003-109213 | 4/2003 |
| JP | 2003-155365 | 5/2003 |
| JP | 2004-164692 | 6/2004 |
| JP | 2004-288250 | 10/2004 |
| JP | 2004-295989 | 10/2004 |
| JP | 2004-295991 | 10/2004 |
| JP | 3576220 | 10/2004 |
| JP | 2005-011459 | 1/2005 |
| JP | 2005-56535 | 3/2005 |
| JP | 2005-243131 | 9/2005 |
| JP | 2005-276325 | 10/2005 |
| JP | 2005-293633 | 10/2005 |
| JP | 2006-048861 | 2/2006 |
| WO | 02/23538 | 3/2002 |

OTHER PUBLICATIONS

Office Action in Japanese Patent Application No. 2005-121695, dated Oct. 6, 2009, and English-language translation.

* cited by examiner

SURFACE PART    INTERIOR PART

FIG. 10

SURFACE PART    INTERIOR PART

FIG. 11

METHOD FOR PRODUCING MAGNETIC RECORDING MEDIUM

CROSS-REFERENCE TO RELATED APPLICATIONS

This application is based upon and claims the benefit of priority from the Japanese Patent Application No. 2005-121695 filed on Apr. 19, 2005; the entire contents of which are incorporated herein by reference.

BACKGROUND OF THE INVENTION

1. Field of the Invention

The invention relates to a method for processing a magnetic recording medium including a patterned medium and a discreet track medium.

2. Description of the Related Art

According to the significant improvement in functions of information processing equipments, such as a personal computer, an amount of information to be handled by a user is being significantly increased. Under the circumstances, there are increasing demands for an information recording and reproducing device having a significantly larger recording density and a semiconductor device having a significantly higher integration degree than the conventional products.

As for HDD (hard disk drive) as a magnetic material device, a finer processing technique is required for enhancing the recording density. Examples of the technique include the conventional lithography technique using exposure process, by which a large area can be finely processed at one time. However, the technique only has a resolution that is equal to or less than the wavelength of light. Therefore, for example, it is hard to form a fine structure in 400 nm or less. There are such processing techniques for a level of 400 nm or less as electron beam lithography and focused ion beam lithography, but these techniques have a problem in throughput, and an apparatus therefor requires higher cost in proportion to the fineness.

In contrast to these techniques, nanoimprint lithography proposed by Chou, et al. is receiving attention as a processing technique having a resolution of about 10 nm (as described in U.S. Pat. No. 5,772,905) while being cheap. In the experimental process of the nanoimprint lithography carried out by Chou, et al., a mask is produced by patterning by direct drawing with an electron beam, and a stamper produced by dry etching with the mask is used. Thermal cycle nanoimprint is carried out on PMMA (polymethyl methacrylate as a thermoplastic resin) layer as a pattern transfer layer on silicon, so as to transfer the pattern. Furthermore, the residual resist is removed by oxygen reactive ion etching (RIE) to expose the silicon surface. Thereafter, for example, etching is carried out with a resist film as a mask, and aluminum or the like is lifted off, so as to form wiring. Matsui, et al. proposes imprint at room temperature by using an SOG (Spin on Glass) as a coating liquid for forming an $SiO_2$ film (as described in JP 2003-100609 A).

SUMMARY OF THE INVENTION

The invention provides a processing method of a magnetic layer that is capable of finely processing the magnetic layer without damaging the magnetic material.

According to an aspect of the invention, a method for producing a magnetic recording medium, includes: forming an SOG film on a surface of a magnetic layer; forming a concavo-convex structure in the SOG film comprising one selected from a group consisting of silica glass, alkylsiloxane polymer, methyl silsesquioxane polymer, hydrogen silsesquioxane polymer and hydro alkylsiloxane polymer; etching the SOG film to expose the surface of the magnetic layer; etching the exposed surface of the magnetic layer by ion milling; and forming a filling layer on the surface of the magnetic layer while leaving a portion of the magnetic layer having been subjected to the ion milling.

According to this method, $SiO_2$ for protecting the surface of the convex portion of the magnetic layer can be formed without high temperature baking at 400° C. or more. Therefore, the magnetic material can be suppressed from being damaged during etch back of the SOG.

DETAILED DESCRIPTION OF EMBODIMENTS OF THE INVENTION

With regard to production of HDD of the patterned medium or a discreet track medium, it is necessary that a magnetic layer is etched using a resist film as a mask in the fine processing technique for improving the recording density. It is difficult herein to use RIE as the etching method of the magnetic layer because of the following reasons. A halide formed as an intermediate product upon etching a magnetic metal, such as Cr, Mn, Fe, Co and Ni, which are a base material of a ferromagnetic alloy in the magnetic layer, have high melt point and high boiling point. Vapor pressure of the halide is extremely low at the room temperature and evaporation heat is large. Therefore, it is difficult to remove the radical reaction product formed upon etching the magnetic layer. Accordingly, the magnetic layer is processed by ion milling. Ion milling is such an etching technique that utilizes a sputtering phenomenon where an inert gas, such as argon, is ionized and accelerated with an electric field to blast off molecules on the surface of material, by which almost all materials can be etched.

There arises such a problem in ion milling that a magnetic material is damaged when ion milling is carried out for a long period of time. For example, in the HDD having a concavo-convex structure, the concave part is filled to stabilize floating of a head. In the case where an SOG, which has been well known as a filling material, is used, ion milling is necessarily carried out for a long period of time for etch back, which may be a cause of damage to the underlying magnetic layer. In other words, there is such a problem that the SOG is too soft as a mask for protecting a magnetic layer. Accordingly, it is necessary that the SOG is vitrified, but the vitrification is not suitable for mass production since a high temperature baking process at 400° C. or more is required for the vitrification.

The following exemplary embodiments solve the problems described above, and will be described in detail below with reference to the drawings.

EXAMPLE 1

A method for producing a perpendicular-magnetic-recording type magnetic recording medium according to this example will be described with reference to FIGS. 1 to 6. The magnetic recording medium herein as an example is a 100 kTPI (track per inch) magnetic recording medium, in which one track contains 120 sectors, and one sector contains 10,000 pits.

Figure 1:
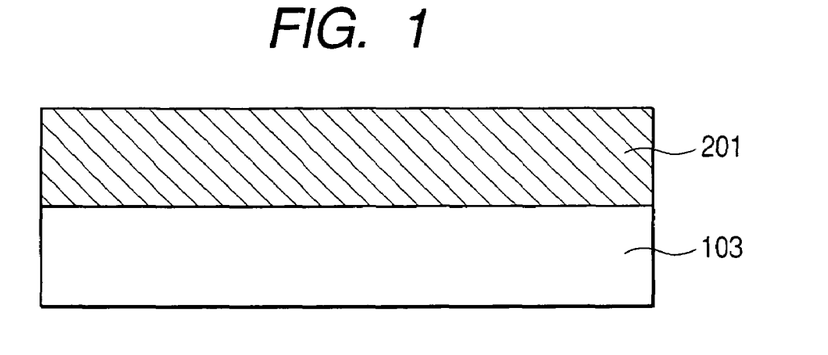
FIG. 1 is a diagram showing a production step of a magnetic recording medium according to an example 1 of the invention.

As shown in FIG. 1, an SOG 201 is coated to a thickness of 100 nm as an etching mask on a magnetic layer 103 formed on a crystallized glass substrate, which is not shown in the figure, having a diameter of 2.5 inch. The magnetic layer 103 is formed in the following manner. An SUL layer, which is not shown in the figure, constituted by a soft magnetic material is formed to a thickness of about 50 nm on the glass substrate. Examples of the material for the SUL layer include such an alloy as CoZr, CoZrNb and CoZrTa. An intermediate layer, which is not shown in the figure, constituted by a non-magnetic material is formed to a thickness of about from 10 to 20 nmon the SUL layer. Examples of the material for the intermediate layer include Ru, Pt, Pd, W, Ti, Ta, Cr, Si, an alloy containing the metal, an oxide thereof and a nitride thereof. A recording layer, which is not shown in the figure, is then formed to a thickness of about 20 nm on the intermediate layer. Examples of the material for the recording layer include CoCrPt. The SUL layer, the intermediate layer and the recording layer constitute the magnetic layer 103 of a perpendicular two-layer medium is constituted by.

Examples of the material for the glass substrate include lithium crystallized glass. Examples of the SOG include silica glass, alkylsiloxane polymer, methyl silsesquioxane polymer (MSQ), hydrogen silsesquioxane polymer (HSQ) and hydro alkylsiloxane polymer. Material of the SOG depends on the chemical structure of siloxane. The SOG 201 is a film containing a solution of the exemplified material.

Figure 2:
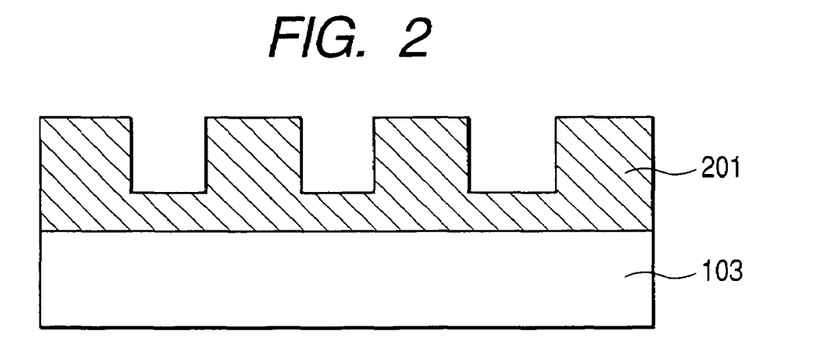
FIG. 2 is a diagram showing a production step of the magnetic recording medium according to the example 1 of the invention.
Figure 11:
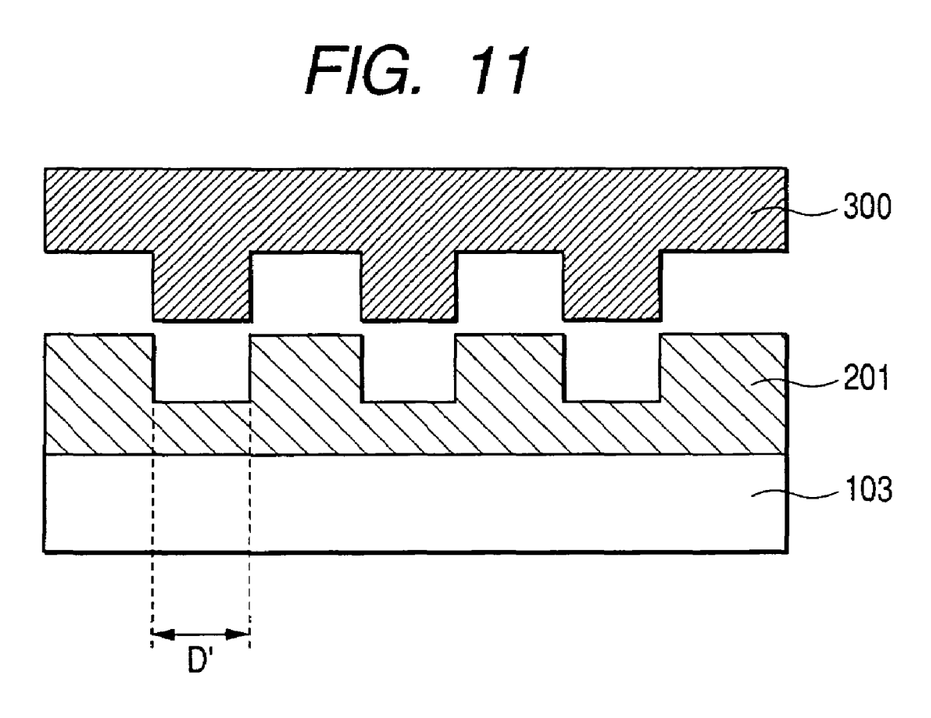
FIG. 11 is a diagram showing a production step of the magnetic recording medium according to the example 1 of the invention.

As shown in FIG. 2, a concavo-convex pattern is then formed on the surface of the SOG 201. Examples of the method for forming the pattern include light exposure lithography, electron beam lithography, focused ion beam lithography, X-ray lithography and nanoimprint lithography. Nanoimprint lithography is employed for forming a fine pattern of 400 nm or less from the viewpoint of mass production. Specific process steps of the nanoimprint lithography will be described below. Upon carrying out imprint, a stamper 300 is dipped with a perfluoroalkyl derivative as a fluorine releasing material to improve the releasing property between the stamper and the SOG 201 at the time of imprint. Accordingly, it is necessary to improve adhesion between the perfluoroalkyl derivative and the stamper 300 formed of nickel. Thus, the stamper 300 is oxidized with an asher at 40° C. or higher for 5 minutes. As the perfluoroalkyl derivative herein, a solution obtained by diluting perfluoropolyether (HOOC—$CF_2$—O—($CF_2$—$CF_2$—O)$_m$—($CF_2$—O)$_n$—$CF_2$—COOH) with Galden HT70 (produced by Solvay Solexis, Inc.) is used. The perfluoroalkyl derivative is coated on the stamper 300 by a louber holding the perfluoroalkyl derivative, and then annealed at 150° C. for 10 minutes in a nitrogen atmosphere. Separately, the SOG 201 (for example, OCD T-7 8000T, produced by Tokyo Ohka Kogyo Co., Ltd.) is spin-coated at 6,000 rpm on the magnetic material, and then pre-baked at 100° C. for 20 minutes so that the SOG 201 has a hardness suitable for imprint. As shown in FIG. 11, the stamper 300 is pressed against the SOG 201 at 2,000 bar for 1 minutes to transfer the pattern onto the SOG 201. A size of the pattern transferred by the nanoimprint lithography onto the SOG 201 is equal to or less than 250 nm. Specifically, the concave portion of the SIG 201 has a width D equal to or less than 250 nm.

Figure 3:
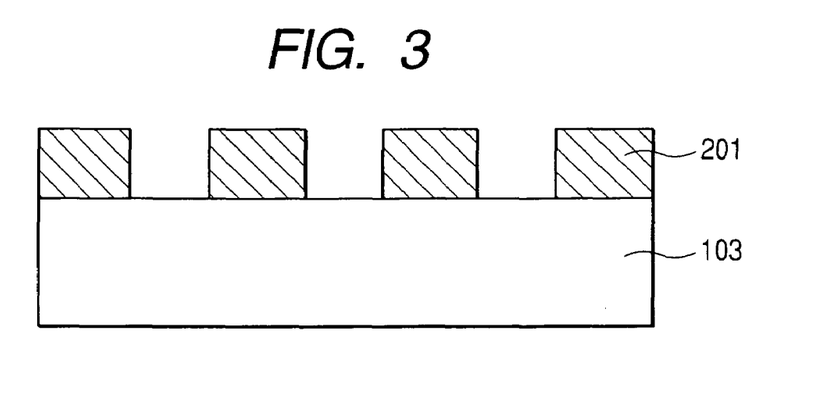
FIG. 3 is a diagram showing a production step of the magnetic recording medium according to the example 1 of the invention.

Subsequently, as shown in FIG. 3, the concave portion of the SOG 201 formed by the stamper 300 is etched by reactive ion etching (RIE) with a fluorine-containing gas to expose the surface of the magnetic layer 103. The fluorine-containing gas herein is not particularly limited by may be $CF_4$ or $SF_6$ so long as it can etch the SOG 201. In order to remove the residue with the concavo-convex structure transferred on to the SOG being prevented from changing as less as possible, high density plasma source RIE in a reduced pressure atmosphere may be used. An ICP (induced coupled plasma) etching apparatus or an ECR (electron cyclotron resonance) etching apparatus may also be used.

Figure 4A:
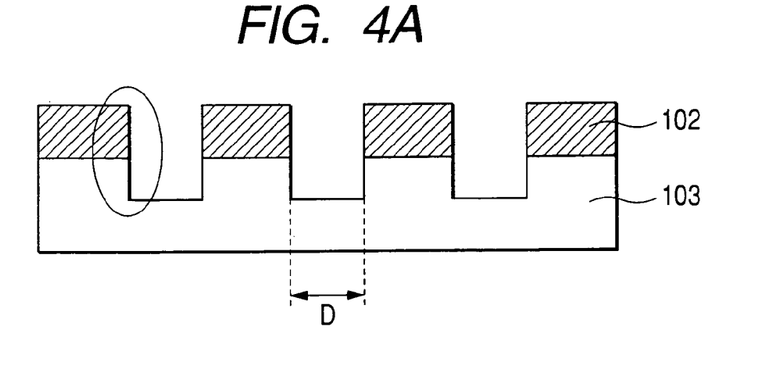
FIG. 4A is a diagram showing a production step of the magnetic recording medium according to the example 1 of the invention.
Figure 4B:
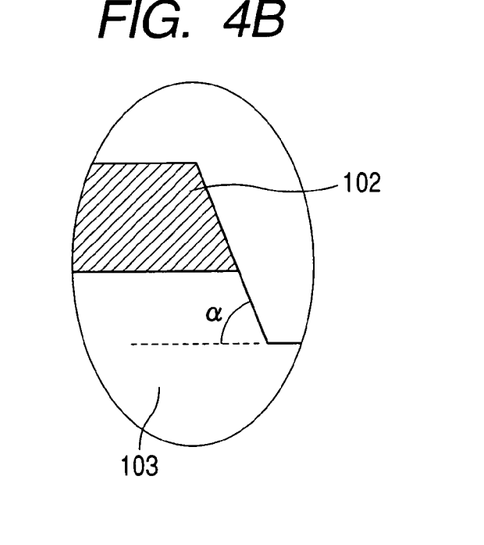
FIG. 4B is an enlarged view of a part surrounded by an ellipse shown in FIG. 4A.

After completing the etching of the SOG 201, the magnetic layer 103 is etched as shown in FIG. 4A. The magnetic layer 103 is etched by ion milling. The ion milling is such a method that ions generated by electron impact are accelerated in a range of from 200 eV to 1,000 eV to carry out etching by utilizing the physical kinetic energy of the ions. In this example, Ar is used as ion. In order to prevent the recording layer in the magnetic layer 103 from being damaged and to prevent the etched material of the recording layer from being re-deposited, the etching is carried out while the ion incident angle is changed to 30° and 70°. According to this operation, the side wall of the magnetic layer 103 has a taper angle α of about from 40 degrees to 75 degrees as shown in FIG. 4B, which is an enlarged view of a part surrounded by the ellipse shown in FIG. 4A.

The physical kinetic energy of the ions is applied to the SOG 201 upon ion milling, whereby the SOG 201 can be vitrified simultaneously with ion milling, without high temperature baking at 400° C. or more. Accordingly, the SOG 201 remaining on the top of the convex pattern of the magnetic layer 103 is changed into $SiO_2$ through vitrification. The etching gas is preferably Ar as in this embodiment since Ar provides a high etching rate and is inexpensive and easy to use, but the etching gas is not particularly limited to Ar so long as it is an inert gas, such as He, Xe and $N_2$.

As a result of etching of the magnetic layer 103 by the ion milling, the pattern formed in the SOG 201 (See FIGS. 2 and 3) is transferred onto the magnetic layer 103. That is, the concavo-convex pattern is formed in the magnetic layer 103. The size of the concavo-convex pattern is equal to or less than 250 nm. Specifically, a width D (see FIG. 4A) of the concave portion of the magnetic layer 103 is equal to or less than 250 nm.

Figure 5:
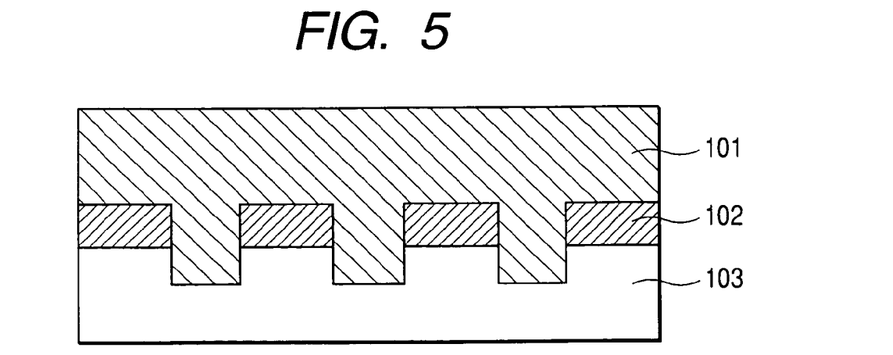
FIG. 5 is a diagram showing a production step of the magnetic recording medium according to the example 1 of the invention.

As shown in FIG. 5, a filling layer 101 formed of an SOG or $SiO_2$ is filled in the concave portion of the pattern defined by the $SiO_2$ 102 and the magnetic layer 103. Since the convex portion of the magnetic layer 103 has the protective mask of $SiO_2$, an SOG may be used as a material for the filling layer 101 owing to the good filling shape thereof. Alternatively, an $SiO_2$ film may be filled by sputtering or bias sputtering.

Figure 6:
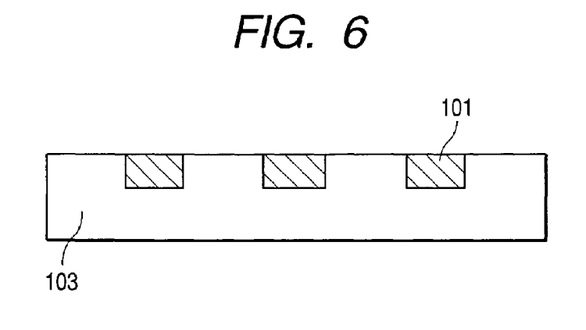
FIG. 6 is a diagram showing a production step of the magnetic recording medium according to the example 1 of the invention.

After forming the filling layer 101, as shown in FIG. 6, the filling layer 101 and the $SiO_2$ 102 are etched back by such a method as ion milling to flatten the surface of the filling layer 101 and the magnetic layer 103.

Figure 7:
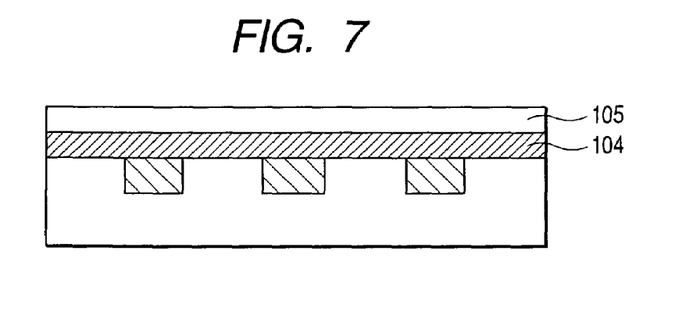
FIG. 7 is a diagram showing a production step of the magnetic recording medium according to the example 1 of the invention.

Finally, as shown in FIG. 7, a carbon protective film 104 having a thickness of about from 3 to 4 nm formed of DLC (diamond-like carbon) having a large proportion of sp3-bonded carbon and a liquid lubricating layer 105 having a thickness of about 1 nm are formed in this order on the surface of the magnetic layer 103. Examples of the method for forming the carbon protective film 104 include a sputtering method using a graphite carbon target and a chemical vapor deposition (CVD) method. In this example, the CVD method is used for forming a carbon protective film 104 rich in sp3-bonded carbon. The liquid lubricating layer 105 can be formed by dipping the surface of the magnetic layer 103 in a vessel filled with a lubricant formed of perfluoropolyether. A magnetic recording medium has thus been completed by the aforementioned process steps.

Figure 8:
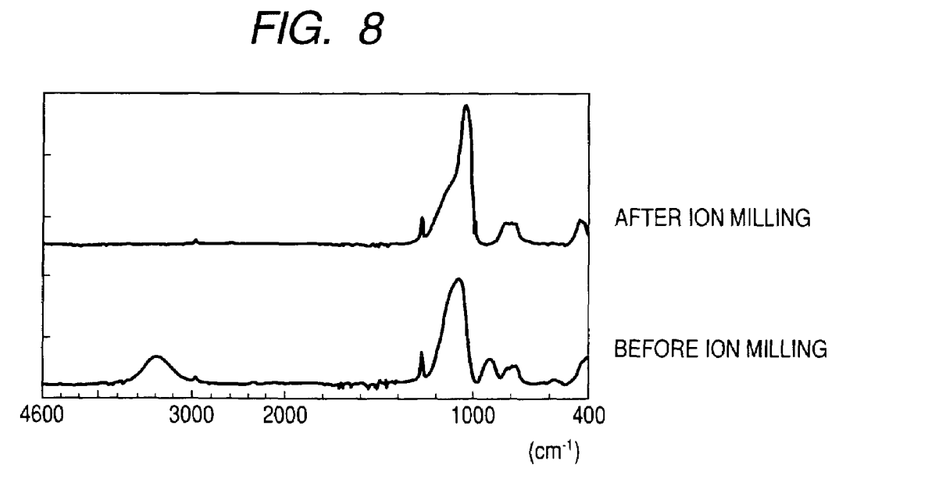
FIG. 8 is a graph showing a result of measurement of infrared emission spectroscopy (FT-IR) of the magnetic recording medium produced by the production method according to the example 1.

FIG. 8 is a graph showing a result of measurement of infrared emission spectroscopy (FT-IR) for determining as to whether or not the SOG 201 has been vitrified through impact of Ar ions in the process step shown in FIG. 4A. It is seen from the result shown in FIG. 8 that the peak, which shows presence of organic substances and appears around a wave number of 3,500 $cm^{-1}$, disappears after the ion milling.

The magnetic recording medium produced in the example 1 was compared in magnetic anisotropy constant (Ku) with a magnetic recording medium produced by a comparative method, in which a magnetic layer 103 having no $SiO_2$ protective mask formed by vitrifying SOG on the top of the convex pattern of the magnetic layer 103 was etched back by Ar ion milling. In the production of the magnetic recording medium by the comparative production method, an SOG was filled in the concave portion of the magnetic layer in such a state that the protective mask has been removed with an $SF_6$ gas, and then etched back by Ar ion milling for a period of from 8 to 10 minutes. The magnetic recording medium produced by the comparative production method had Ku of $5.1 \times 10^5$ (erg/cc), but the discreet medium produced in the example 1 had an increased value of Ku, $2.0 \times 10^6$ (erg/cc).

Figure 9:
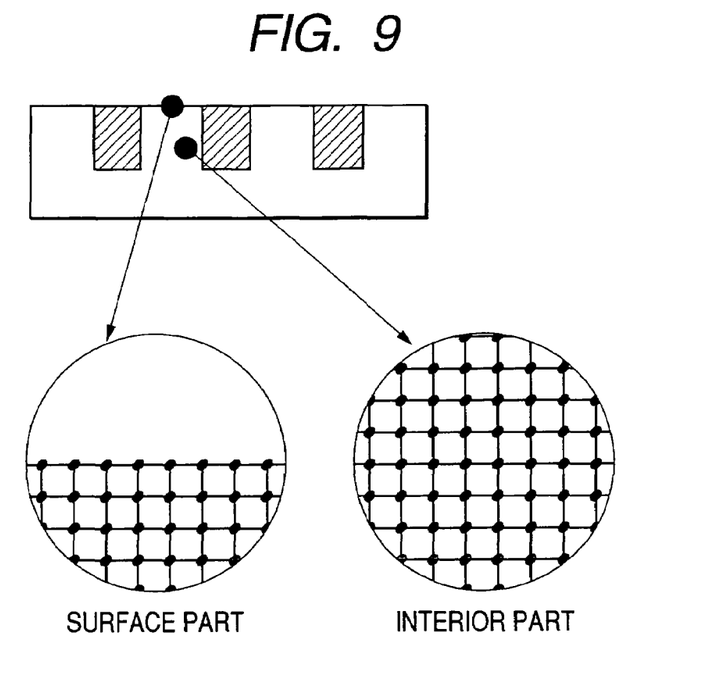
FIG. 9 is a schematic TEM image of the magnetic recording medium according to the example 1.
Figure 10:
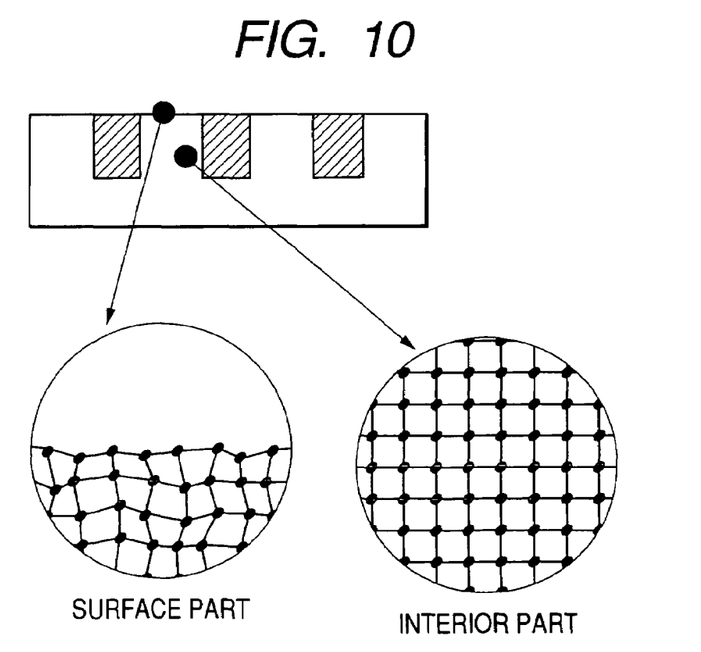
FIG. 10 is a schematic TEM image of a magnetic recording medium according to a comparative example.

The magnetic recording medium produced by the production method of the example 1 and the magnetic recording medium produced by the comparative production method were observed with a transmission electron microscope (TEM). FIG. 9 is a schematic TEM image of the magnetic recording medium of the example 1, and FIG. 10 is a schematic TEM image of the magnetic recording medium of the comparative example. In the magnetic recording medium of the comparative example having no $SiO_2$ protective mask on the convex portion of the magnetic layer 103, an image of an amorphous state was observed in the surface part of the magnetic layer 103 although a clear lattice image was found in the interior part thereof as shown in FIG. 10. In the magnetic recording medium produced in the example 1, a clear lattice image was found in both the interior part and the surface part as shown in FIG. 9. Accordingly, it is understood that when the $SiO_2$ protective mask is not formed on the convex portion of the magnetic layer 103, the magnetic material is damaged through etch back by ion milling for a long period of time, which brings about an amorphous state of the magnetic material.

Furthermore, a magnetic recording apparatus having the magnetic recording medium produced by the method of the example 1 was evaluated for recording and reproducing characteristics. Obtained was a signal equivalent to the SNR estimated from the material before processing. Accordingly, it is confirmed that no damage occurs in processing the magnetic material by ion milling.

According to the method for producing the magnetic recording medium according to this example, one material selected a group consisting of silica glass, alkylsiloxane polymer, methyl silsesquioxane polymer (MSQ), hydrogen silsesquioxane polymer (HSQ) and hydro alkylsiloxane polymer is used as the SOG 201. During etching of the magnetic layer 103, the SOG 201 is vitrified with ions as an etchant. Thereby, the vitrified SOG 201 functions as an etching mask. Accordingly, a high temperature baking process of 400° C. or more for forming an etching mask is not required.

The examples shown above are mere exemplifications of equipments and methods for practicing the technical spirit of the invention. The invention is not limited to materials, shapes, structures and arrangements of constituent components, which are disclosed in the above-examples. Various modifications may be made when practicing the invention unless the spirit and advantages of the invention are impaired.

What is claimed is:

1. A method for producing a magnetic recording medium, the method comprising:
    forming a SOG film on a surface of a magnetic layer;
    forming a concavo-convex structure in the SOG film comprising one selected from a group consisting of silica glass, alkylsiloxane polymer, methyl silsesquioxane polymer, hydrogen silsesquioxane polymer and hydro alkylsiloxane polymer;
    etching the SOG film to expose the surface of the magnetic layer;
    etching the exposed surface of the magnetic layer by ion milling to change the SOG film into an $SiO_2$ film; and
    forming a filling layer on the surface of the magnetic layer while leaving a portion of the magnetic layer having been subjected to the ion milling.

2. The method according to claim 1, wherein the etching by the ion milling comprises accelerating ions generated by electron impact, in a range of from 200 eV to 1,000 eV.

3. The method according to claim 1, wherein the filling layer includes SOG.

4. The method according to claim 1, wherein the forming of the concavo-convex structure comprises pressing a stamper plate having an original pattern against the surface of the magnetic layer on which the SOG film is formed.

5. The method according to claim 4, wherein:
    the concavo-convex structure of the SOG film comprises a concave and a convex, and
    a width of the concave is equal to or less than 250 nm.

6. The method according to claim 1, wherein:
    the etching by the ion milling forms a concavo-convex structure in the surface of the magnetic layer, the concave-convex structure of the magnetic layer comprises a concave and a convex, and a width of the concave is equal to or less than 250 nm.

7. The method according to claim 3, further comprising:
etching back the $SiO_2$ film and the filing layer by ion milling.

8. The method according to claim 2, wherein the accelerated ions are incident such that a sidewall of the etched magnetic layer has a taper angle of about 40 degrees to 75 degrees.

9. A method for producing a magnetic recording medium, the method comprising:
forming a spin on glass (SOG) film on a surface of a magnetic layer;
forming a pattern in the SOG film;
etching the patterned SOG film to expose the surface of the magnetic layer;
performing ion milling to simultaneously etch the exposed surface of the magnetic layer and to change the SOG film into a silicon oxide film; and
forming a filling layer on the surface of the magnetic layer.

10. The method according to claim 9, wherein the SOG film comprises one selected from a group consisting of silica glass, alkylsiloxane polymer, methyl silsesquioxane polymer, hydrogen silsesquioxane polymer and hydro alkylsiloxane polymer.

11. The method according to claim 9, further comprising:
etching back the silicon oxide film and the filling layer by ion milling.

12. The method according to claim 9, wherein the ion milling comprises accelerating ions so as to form tapered sidewalls in the etched magnetic layer.

* * * * *